INVENTOR.
BRUNO F. ARPS
BY
ATTORNEY

Feb. 5, 1957         B. F. ARPS         2,780,014
DETACHABLE BRACKET AND SPADE CUTTER FOR TRENCH DIGGER CHAIN
Filed May 7, 1954         2 Sheets-Sheet 2
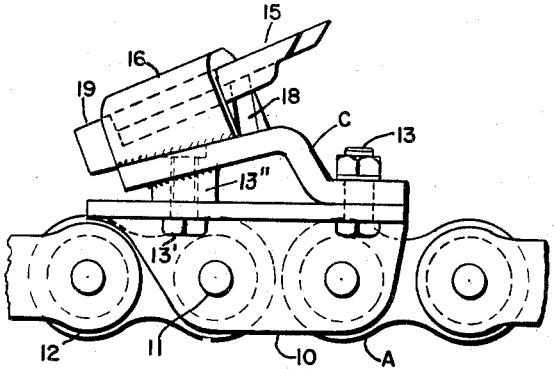
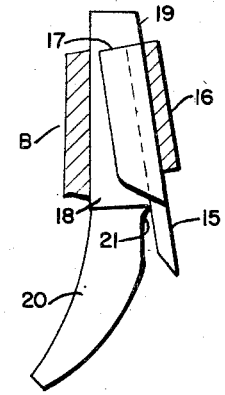
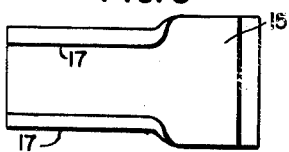
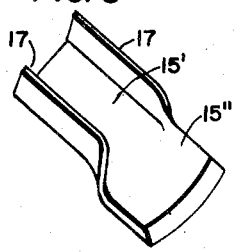
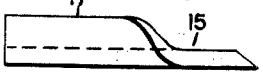
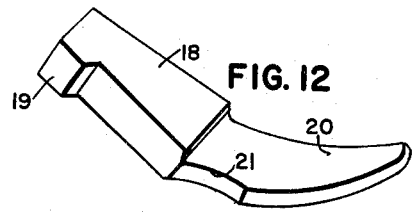
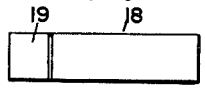
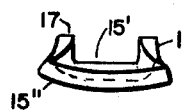
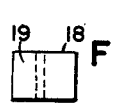
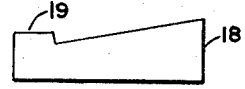
INVENTOR.
BRUNO F. ARPS
BY
*U.S. Kroh*
ATTORNEY

United States Patent Office 2,780,014
Patented Feb. 5, 1957

2,780,014

DETACHABLE BRACKET AND SPADE CUTTER FOR TRENCH DIGGER CHAIN

Bruno F. Arps, New Holstein, Wis., assignor to Arps Corporation, New Holstein, Wis.

Application May 7, 1954, Serial No. 428,180

2 Claims. (Cl. 37—191)

The present invention relates to novel detachable brackets for holding novel detachable spade cutters for trench digger chains and has for its object providing a device of the character which is suitable for efficient operation in all manner of soil conditions wherein the soil may be frozen for a considerable depth, full of stones or having a hard packed roadway surface.

The conditions under which a trench digger must operate are frequently extremely difficult. There is usually a gang of men in attendance and for this reason the digger must be capable of operating continuously and without frequent delays. For example, the operator must be able to replace worn out or broken cutters or a broken bracket within a few moments; and therefore, obviously the device must be simple and very sturdy.

A special object of the present invention is to provide a simple and efficient means for attaching the cutters to the brackets, whereby they may be removed and replaced quickly and without special tools.

To these and other useful ends my invention consists of parts, combinations of parts or their equivalents and mode of operation as hereinafter described and claimed and shown in the accompanying drawings in which:

Fig. 3 is a side view of the device similar to that shown in Figures 1 and 2, except that there is but one cutter socket positioned on the transverse center of its bracket.

Fig. 4 is a fractional view taken on line 4—4 of Figure 1 and illustrating the cutter and its holding wedge, the wedge having a depth controlling runner as illustrated in Figure 12.

Fig. 5 is a top view of one form of a cutter.

Fig. 6 is a side view of the cutter as shown in Figure 5.

Fig. 7 is a front end view of a cutter similar to that shown in Figures 5 and 6 except its front end is offset downwardly and crescent shaped.

Fig. 8 is a perspective view of a cutter as shown in Figure 7.

Figs. 9, 10 and 11 are different views of the cutter holding wedge without the runner shown in Figures 4 and 12.

Fig. 12 is a perspective view of the wedge shown in Figures 9, 10 and 11 except having a runner on its front end and as illustrated in Figure 4.

Figure 1:
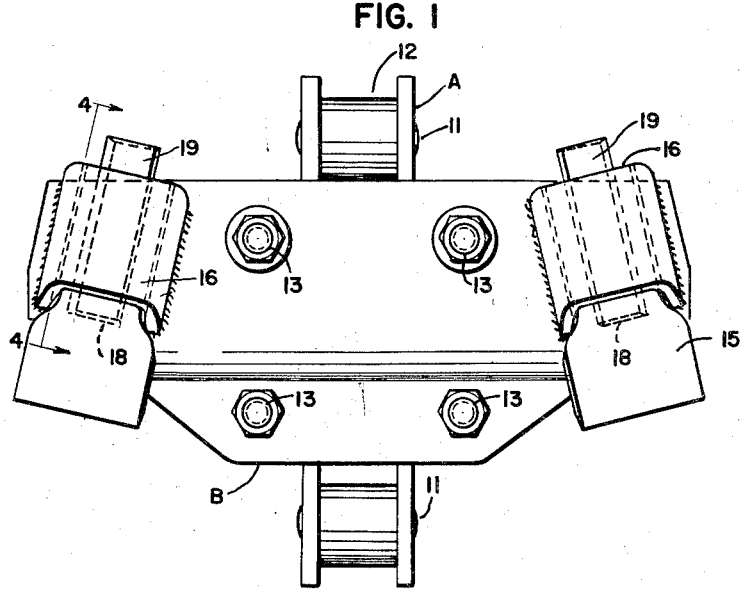
Fig. 1 is a top view of one form of my invention having two cutters and shown as attached to a fraction of a roller chain.
Figure 2:
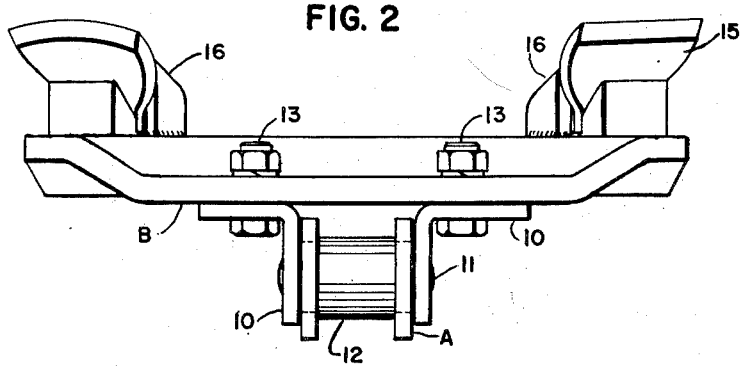
Fig. 2 is a front view of my invention as shown in Figure 1.

As thus illustrated the chain is in its entirety designated by reference character A as shown in Figures 1, 2 and 3. The cutter holding brackets shown in Figures 1 and 2 are designated in their entireties by reference character B and the cutter holding bracket shown in Figure 3 is designated in its entirety by reference character C. Brackets B and C are preferably secured to the chain by two L-shaped brackets 10—10 as clearly illustrated in Figures 2 and 3. The ends of roller pins 11 extend preferably through the brackets in a manner whereby brackets 10 are firmly held to the chain. Members 11 form spindles for chain rollers 12.

Brackets B are secured to brackets 10 by means of four bolts 13 and brackets C are secured to brackets 10 by means of two front bolts 13 and two rear caps 13'. A spacer sleeve 13" is preferably secured under bracket C for caps 13' as illustrated in Figure 3.

Brackets B and C are preferably secured to the chain in groups in spaced relation, bracket C being preferably the leading bracket of the group, and having a single tapered socket 16 positioned in transverse central alignment with the chain. Brackets B may have varying lengths and having a tapered socket 16 on each end thereof.

In each group of brackets there may be one or more brackets B depending upon the width of the trench to be cut. The cutter on brackets C preferably forms a central trench in the trench being cut and each following pair of cutters on bracket B is preferably arranged to widen this trench successively, the cutters on the rear bracket of a group of brackets completing the cutting of a slice for the full width of the trench; thus for a very narrow trench a bracket C and B only may be required and for a very wide trench several brackets B may be required in each group of brackets.

The cutters as shown in the figures are made from mill run bar stock having great strength and are capable of being formed after being heated in one operation, and tempered immediately thereafter, thus to save fuel and cost, the greater length of the cutters having flanges 17 formed thereon forming a width for free reception into sockets 16 as illustrated, cutter blades 15 are shaped as shown.

I provide tapered wedges 18 having at their rear ends projections 19. These wedges are adapted to lie between flanges 17 with the rear end of the cutter resting against projections 19 as shown in Figure 4. Thus as illustrated a wedge may be laid between flanges 17 with projection 19 in contact with the rear end of a cutter and the assembly placed in the socket from the front end of the socket and made taut by a blow on the front end of the wedge and loosened by a blow on the rear end of the wedge.

Referring now to Figures 7 and 8 in which a very desirable form of cutter is shown, comprising a base 15', flanges 17 and a blade 15", the blade portion 15" being crescent shaped or curved as clearly shown, the side edges of the blade merging into the front of flanges 17 by a double curve; thus the design shown in Figures 7 and 8 is strengthened for its entire length and the crescent shape of the front end of the cutter will add to its digging qualities.

I preferably provide wedges 18 with runners 20 having a depression 21 extending from the wedge proper to near the front end of the cutter, for regulating the depth of cut of the cutter which under certain conditions would without the runner, gouge into the material being cut free and cause more or less trouble.

It will be noted that thrust against the cutters because of projection 19 will tend to tighten the wedge and cutter in the socket.

The cutters are to some extent self-shapening; however since they are so easily removed when too dull, they may be ground sharp on an emery wheel.

I have shown sockets 16 in Figures 1 and 2 as positioned on a slight angle to the direction of travel. This angled position is optional especially when the blades shown in Figures 7 and 8 are used.

In digging trenches of considerable width at least the rear bracket in a group of brackets must necessarily have considerable length; and especially when runners 20 are not used I have contemplated mounting the brackets on two transversely spaced chains in the same manner as the mounting shown in Figures 2 and 3, thus to add strength to the device and act to limit the tilting of the brackets.

I have shown the preferable means for attaching brackets B and C to the chain, clearly other means may be used for the purpose.

Having thus shown and described my invention, I claim:

1. In cutter heads for a trench digger having an endless chain, a plurality of L-shaped brackets secured in spaced relation to adjacent sides of the chain, cutter brackets secured to said L-shaped brackets, a tapered socket member secured to each cutter bracket, a cutter for each socket formed from flat stock, the rear end portion of each cutter being of a width to permit its free reception into a tapered socket member, a wedge for each cutter, each wedge having a rigid shoulder on its rear end forming with the rear end of a socket member, a stop for the adjacent end of the cutter whereby the rear ends of a cutter and wedge may be inserted into the front end of a socket member and made fast by a blow on the front end of the wedge and loosened by a blow on the other end portion of the wedge, each wedge having its front end portion formed with curved runners which extend forwardly outwardly away from the cutter engaged by said wedge to limit the depth of cut made by the cutter.

2. In a detachable bracket and spade cutter assemblage for trench digger chains, a plurality of cutter head brackets attached in spaced relation to an endless trench digger chain, a tapered socket member secured to each cutter head bracket, cutters formed from flat stock and having a portion of their inner ends formed with side flanges for free reception within said socket members, wedges formed with projections on their inner ends for engagement with the inner ends of the cutters, curved runners on the front end portions of said wedges and extending forwardly outwardly away from said cutters in a position to limit the depth of cut of the cutters, said cutters and wedges being adapted to be inserted into the front ends of the tapered sockets and made taut by a blow on the front ends of the wedges and loosened by a blow on the inner ends of the wedges.

References Cited in the file of this patent
UNITED STATES PATENTS

| | | |
|---|---|---|
| 594,896 | Palmer | Dec. 7, 1897 |
| 1,244,785 | Sessions | Oct. 30, 1917 |
| 1,325,029 | Morgan | Dec. 16, 1919 |
| 1,397,679 | Dunlap | Nov. 22, 1921 |
| 1,522,860 | Boots | Jan. 13, 1925 |
| 1,568,870 | Bowman | Jan. 5, 1926 |
| 2,211,786 | Lehman et al. | Aug. 20, 1940 |
| 2,608,222 | Jensen et al. | Aug. 26, 1952 |